Feb. 23, 1943.  E. STELLER  2,312,131
APPARATUS FOR HANDLING MILL SPINDLE AND COUPLING
Filed June 19, 1941  2 Sheets-Sheet 2
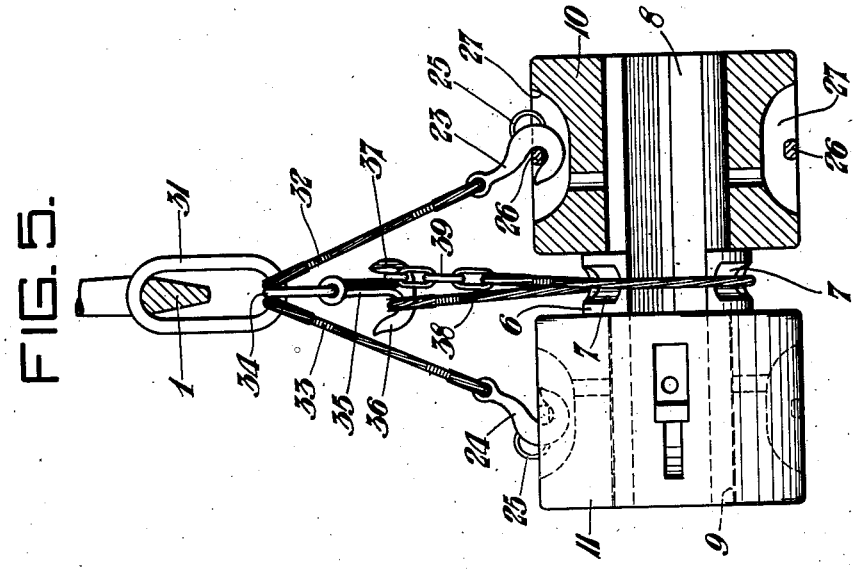
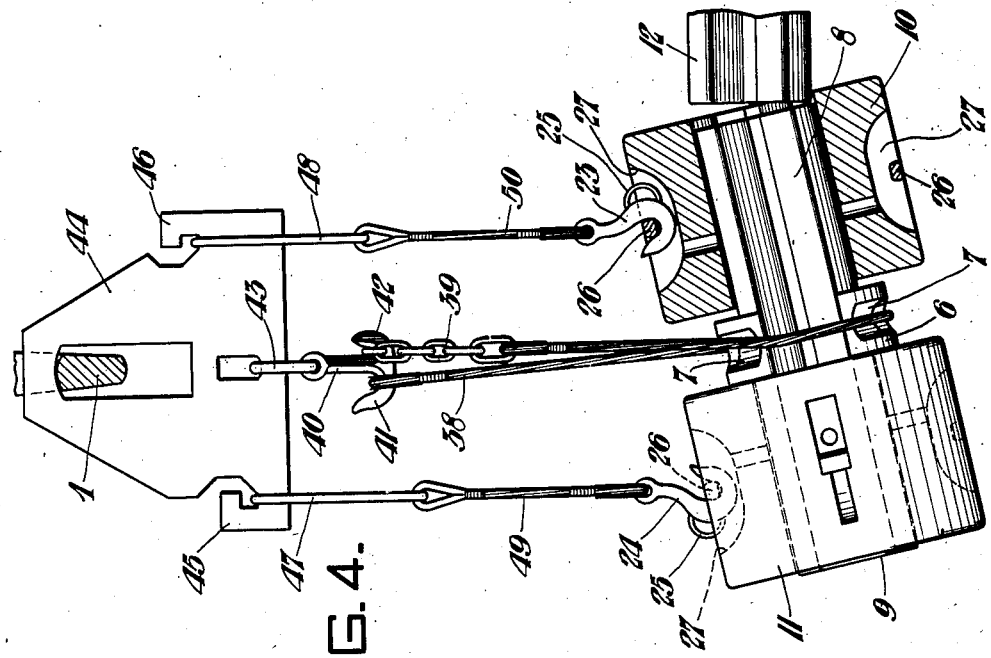
*Inventor:*
EMIL STELLER,
by: *John E. Jackson*
*his Attorney.*

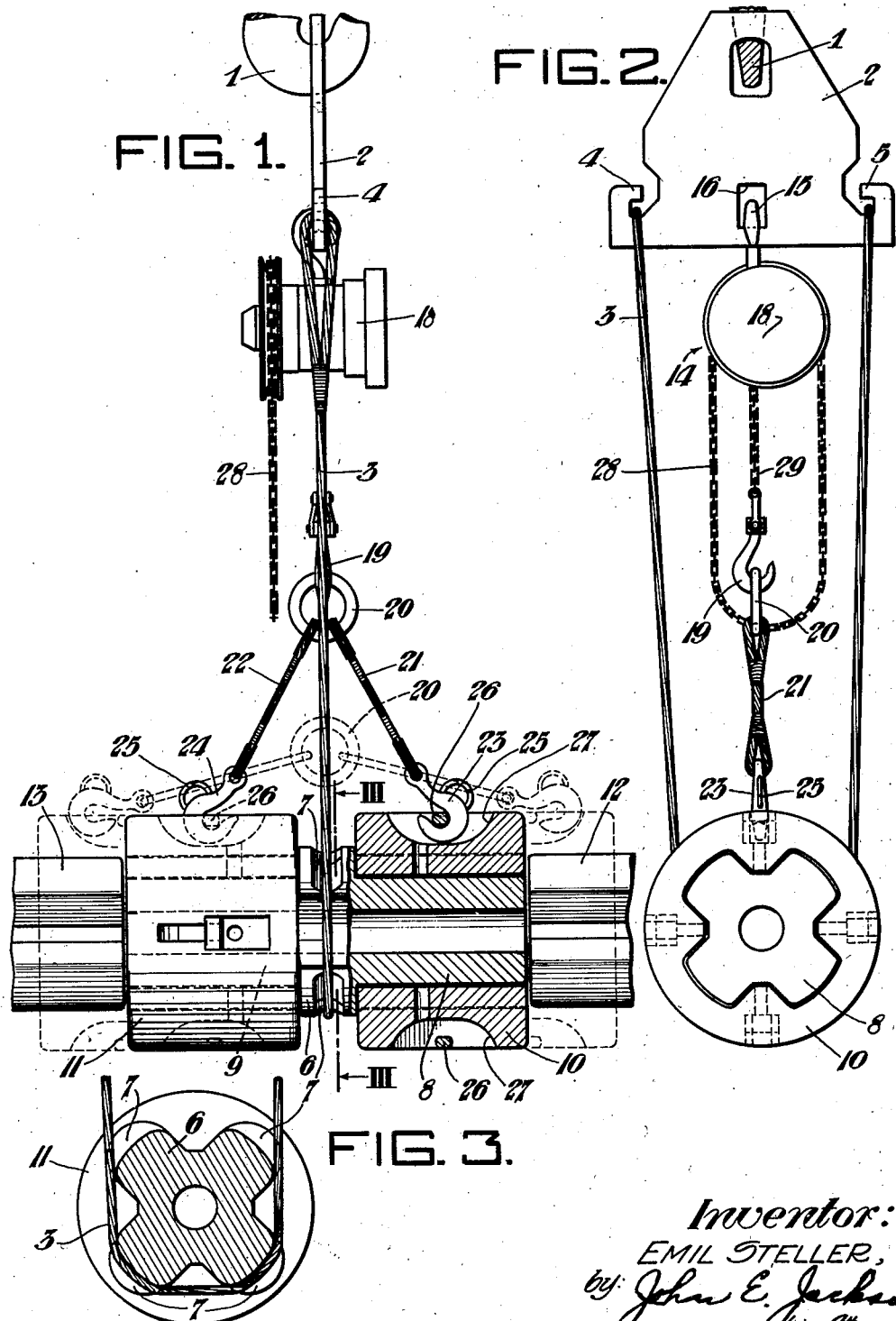

Patented Feb. 23, 1943

2,312,131

UNITED STATES PATENT OFFICE 2,312,131

APPARATUS FOR HANDLING MILL SPINDLE AND COUPLING

Emil Steller, Chicago, Ill.

Application June 19, 1941, Serial No. 398,847

9 Claims. (Cl. 294—74)

This invention relates generally to rolling mills and, more particularly, to an apparatus for safely handling the relatively heavy spindle shafts and coupling boxes as a unit for replacement or repair thereof, or of the mill rolls.

To remove and replace a driving coupling for rolling mills constitutes a distinct problem from that of handling other large and heavy mechanism because the coupling mechanism usually comprises a few very heavy parts, including a male spindle shaft connecting two female coupling boxes, which must be handled as a unit, both in removing and replacing, to provide a driving connection between a power drive shaft and a driven mill roll or shaft. The two coupling boxes and the spindle shaft, as an assembled unit, may weigh from two to two and a half tons, depending on the particular size and duty of the rolling mill. The spindle may weigh from 1500 to 2250 pounds, and the coupling boxes may weigh from 1150 to 1250 pounds or more. The design of the rolling mill and the location of the machine is such that it is not possible or practicable to remove or replace one of the parts at a time.

In accordance with prior practice, it has been the quite common practice for the millwright or other mechanic to pry the coupling from the ends of the power drive shaft and the shaft of the driving mill roll, respectively, and slide said coupling boxes on opposite ends of the spindle shaft. An overhead crane was brought to position and a cable sling usually slung around a centrally disposed flange, collar, or series of arms on the spindle, said collar or arms being peripherally grooved or notched to receive the sling. It was essential to maintain the spindle shaft in a substantially horizontal plane to maintain a balance and equilibrium of the three elements comprising the suspended composite unit, and to prevent either of the massive coupling boxes from sliding from either end of the spindle. If by any accident one coupling box slipped from one end of the spindle, an unbalanced condition was created in which it was almost certain that the second coupling box on the other end of the spindle shaft would also fall. Of course, such a condition creates an extremely hazardous situation, endangering life and property.

As a means of effecting a balance of the suspended unit, with the spindle shaft in a substantially horizontal position, it was the common practice in the prior art for one of the workmen to "ride the crane," as it might be called, by standing on the coupling boxes as they were suspended from the crane, and he would endeavor to maintain a balance of the unit and steer the same by shifting his weight, as needed, from one coupling box to the other in order to obtain the requisite balance to prevent either coupling box from falling from the end of the spindle. This, of course, constituted a very hazardous practice for the person standing on the unit, as the unit was suspended in air from the crane hook.

In order to overcome the hazards incident to the workman riding the crane, and the condition of unstable equilibrium of the elements of the suspended unit, a means is provided wherein a horizontal component of the initial lifting force is employed in a manner to be effective to shift or slide both of the massive coupling boxes toward each other and onto the spindle so as to be clear of the power drive shaft at one end, and clear of the mill roll shaft at the other end of the spindle. After the two coupling boxes have been slid on opposite ends of the spindle, so as to be almost free and clear of the driving power and mill roll shafts, respectively, by two slings extending from the crane hook to each one of the axially slidable coupling boxes, respectively, a third crane sling about the central collar portion of the spindle is so arranged and disposed as to become effective to carry substantially the weight of the spindle and assembled unit; and the two outside slings, having one end of each of the respective slings connected to the coupling boxes, serve primarily to balance the coupling boxes on the spindle while the composite unit is suspended from the crane, and to prevent either of the coupling boxes from accidentally sliding from the spindle. Reference was made above to the two coupling boxes being almost free and clear of the power drive shaft and the roll mill shaft, respectively, at the time that the third sling is brought to position about the spindle, so as to take the support of substantially the entire weight of the spindle and the two coupling boxes, the two outside slings serving to balance the coupling boxes, but not necessarily to sustain their entire weight, although a part of the weight may be sustained, depending upon the relative length and adjustment of the two slings going to the respective coupling boxes, the third central sling extending to and about the spindle. It is desirable to have the third central sling so arranged and adjusted as to its length that the above conditions are fulfilled. Under such conditions the two coupling boxes may then be readily moved to a position on the spindle, so as to be entirely free and clear of the power drive shaft and the mill roll shaft, respectively, by a prying or wedging action by a suitable bar, or by a bumping or thumping action. The important point is that the third middle sling is the one which primarily carries the weight of the spindle, or composite unit, when the outside slings balance the coupling boxes, in order to avoid the hazards of the prior art where the operator stood on the coupling boxes while they were suspended from the crane, and balanced the composite unit by shifting his weight from one side to the other. By adjusting the length of the two outside slings relative the third central sling, the two outside slings may be made to carry a substantial portion of the weight of the composite unit, particularly when removing the same from its normay position in the roll mill.

The coupling boxes may be more readily slid from the power drive shaft and the roll mill shaft, and onto the spindle, if the weight of the spindle in whole or part is supported from the crane during this axial sliding of the couplings boxes. This is not absolutely essential, because the horizontal force component, effective axially of the spindle by the upward pull of the crane transmitted along the two slings having their ends suitably connected to the coupling boxes, may alone be substantially sufficient to cause the coupling boxes to slide on to the spindle, free and clear of their connection with the power drive and the mill roll, respectively. The shifting or sliding of the coupling boxes on the spindle is more readily accomplished by the cooperative use and function of the central sling when so arranged and disposed as to support the weight of the spindle, in part or whole, during the axial sliding movement of the coupling boxes throughout a part or all of such movement. Under these latter conditions, the cooperative employment of the third sling, with respect to the outside slings, serves to support and maintain the spindle in a floating-guiding relation for the movement of the coupling boxes. The latter relation holds true both in removing the coupling boxes and also in replacing or restoring the spindle and coupling boxes to normal functioning driving relation with the power drive and mill roll. In replacing or reassembling the spindle and coupling boxes in normal driving relation, it is preferable to employ the cooperative action between the two sets of slings in such a slightly modified manner as to facilitate axial sliding of the respective coupling boxes in the opposite direction to that employed in removing the composite unit; but even in such arrangement, the third central sling cooperates by functioning as it did when removing the parts, in that it continues to sustain the weight of the spindle and, possibly, more or less of the weight of the coupling boxes, depending upon the particular circumstances. To facilitate axial sliding movement of the coupling boxes in the opposite direction (that is, in replacing the unit), a bail member is interposed between the crane hook and one end of each of the slings, so that the central main load-carrying sling and the two balancing slings leading to the respective coupling boxes may hang or extend downwardly to their respective points of connection with the composite unit in substantially vertical planes. The vertical disposition of the two balancing slings readily permits a slight axial movement of the coupling boxes outwardly from the spindle in order to telescope, or effect alignment and registry with, the ends of the power drive shaft and mill roll shaft, respectively. A slight amount of lost motion or looseness in each of the balancing sling connections would contribute toward the initial telescoping of the ends of the respective power driving and mill roll driven members by the axially movable coupling boxes. The coupling boxes could then be readily pried or jimmied into operative driving position in the usual manner, after the connection with the balancing sling has been removed. Where the various slings hang vertically from a common bail member, and the lower end of each sling is connected to separate members, such as the two coupling boxes and the spindle, it is desirable to so support or mount the upper ends of the three slings upon the bail that the spindle, with the coupling boxes nested thereon—to form, as it were, a suspended three-part composite unit—is supported at a slight angle. This tends to keep the parts of the composite unit together in nested relation, by reason of angular tilt and frictional engagement, and serves to prevent the parts from separating accidentally while suspended, due to any uneven or unbalanced inertia effect of the various parts as they are moved or swung from the crame—such as might be the case if the spindle were carried in a horizontal plane, and if the two balancing slings carried the weight of their respective coupling boxes in a loose or dangling relation with respect to the spindle. A tilted position of the spindle may also serve to facilitate alignment of one end of the spindle with one end of the power drive, or mill roll shaft, and the "easing-one" of the coupling box, in a manner hereinafter more clearly pointed out.

In the accompanying drawings one selected embodiment and certain modifications have been shown for purposes of illustration, but it is to be understood that various other changes and modifications in arrangement and details of construction may be made by the person familiar with the art without departing from the spirit of the invention.

In the accompanying drawings:

Figure 1 is an elevation view partly in section showing one coupling box and one end of the spindle in section, the full line position indicating the relative position of the spindle and the pair of coupling boxes supported thereon after the latter have been moved axially of the spindle to a position free and clear of the ends of a power drive shaft and a mill roll shaft, respectively; the dotted line position indicating the position of the pair of coupling boxes and the balancing slings before the coupling boxes have been moved;

Figure 2 is a side elevation of Figure 1, indicating more clearly one means for effecting movement of the balancing sling to obtain movement of the coupling boxes axially of the spindle shaft by utilizing a horizontal component of force of the upward pull upon one end of the balancing spindle before the composite unit, including the spindle and the pair of coupling boxes, has been moved upward;

Figure 3 is a section looking in the direction of the arrows and taken on the line III—III of Figure 1, said section being taken through what might be termed the arms or spider section located centrally of the spindle and having a suitable peripheral recess or notched portion to accommodate a sling;

Figure 4 is an elevation showing a modified form more particularly adapted for replacing the composite unit, including the spindle and pair of coupling boxes, a bail member being employed as a common member or medium from which the weight-carrying central sling and the pair of balancing slings are suspended, the suspension in this particular form being from the bail member in such a manner that the various slings hang in vertical balance, rather than having the balancing slings angularly disposed, as shown in Figure 1; such a vertical disposition of the balancing slings facilitates movement of the coupling boxes axially of the spindle and away therefrom in a direction to telescope the power driving and mill roll shafts, respectively; and Figure 5 is an elevation showing one of the coupling boxes in section, and a modified form and arrangement particularly adapted for removing the spindle and pair of coupling boxes, and in this respect is similar to the arrangement shown in Figure 1 excepting, however, that a locking hook is suspended from the same supporting ring, carried by a crane hook that supports the pair of balancing slings, and excepting further that one end of the central sling is provided with means for readily adjusting the length thereof.

As shown in the drawings (see Figures 1 and 2), a crane hook 1 supports a bail member 2, and said bail member, in turn, serves as a common supporting medium from which a plurality of slings is suspended in a manner for safely and conveniently handling a heavy and bulky composite unit including, as parts thereof, a spindle and a pair of coupling boxes. For convenience of reference, one of the slings will be designated the central sling, which serves primarily as the one which is slung about the central portion of the spindle and serves to support and carry the weight of the spindle and also two coupling boxes when said boxes are positioned upon said spindle free and clear of other shafts which they normally telescope when said spindle boxes are in operative functioning position in the rolling mill. The other sling will be referred to as the balancing sling because this is the prime function of such balancing sling when the composite unit is suspended from the crane hook.

As shown in Figures 1 and 2, the central sling 3 has one end thereof positioned over the hooked end portion 4 of the bail, said sling extending downwardly about the central portion of the spindle, the other end being positioned over the hooked portion 5 on the opposite end of the bail 2. As shown more clearly in Figures 1 and 3, when the composite unit is held in suspended position, the bail 3 is accommodated by, or fits within, the bail-receiving groove or recess 7 at the periphery of the spider arms 6.

The spindle portion proper includes spindles 8 and 9 extending outwardly in opposite directions from the centrally disposed spider arms 6. These spindle portions proper (8, 9) are also formed as projecting arm portions, more clearly shown in end elevation in Figure 2, and also in section in Figure 3. This configuration is a common one in order to effect a strong and rugged driving relation between a power drive shaft or spindle 12 and a driven mill roll spindle or shaft 13, by means of a coupling box connection including a spindle member, above referred to, including portions 8 and 9, and also a pair of coupling boxes designated as 10 and 11. The interior bore of the coupling box is shaped to correspond with the armed spider portion of the spindle shaft 8, 9. The spindle box 10 is slidable axially along the spindle shaft 8 at one end and into telescoping relation with the end of the power drive spindle or shaft 12, it being understood that the spindles 8 and 12 have their arm portions aligned so that the coupling box may be moved to the dotted line position, as indicated in Figure 1, where a driving relation is established between the power drive shaft 12 and the spindle 8 through the coupling box 10. A suitable means may be provided for retaining the coupling box 10 in normal functioning position, and for this purpose a set screw, or other suitable means well known in the art, may be employed.

A driving connection between the spindle and the driven mill roll shaft 13 is established by sliding the coupling box 11 axially of the spindle shaft so as to occupy a position corresponding to the dotted line position in Figure 1. It is to be understood, of course, that the ends of the shafts 12 and 13 are fixed as part of the rolling mill mechanism and are not normally intended to be movable upwardly except under conditions of replacement or repair of such parts.

If for any reason it is desired to make repairs or replace parts, and if it becomes necessary to remove the mill roll (not shown) connected to the shaft of the spindle 13, it may become necessary to remove the coupling connection, which includes the spindle and the pair of coupling boxes thereon. As above noted, these parts are very heavy and cumbersome and are arranged in a limited space so that the removal and replacement thereof involve considerable of a problem, particularly where the parts of the composite unit, when suspended, are relatively movable if the balance is destroyed during movement. Two systems of slings are employed, one of which, namely, the central or primary load-carrying sling, has above been referred to, and it is desirable to provide a second sling so disposed as to cooperate with the load-carrying sling, not only through the period of transporting the load, but also during an initial period when the coupling boxes are moved axially of the spindle to a position where they will be free and clear of the power drive shaft 12 and of the mill roll shaft 13. The arrangement and disposition of the system of slings to effect cooperation therebetween during this initial period of nesting the parts of the composite unit, for suspension and transportation by the crane hook 1 in a safe manner and without undue hinderance and interference between the load-carrying function of the central sling 3, and the balancing function of the other sling system, constitute one of the important features of the present invention.

Various relative arrangements may be employed to prevent undue interference, during the initial period, between the functioning of the various sling systems. One of the features which is somewhat critical in the arrangement, disposition and functioning of the sling system arises from the fact that both of the sling systems are carried or supported by a common supporting member and are subject to the upward movement thereof during transport of the load after it is brought to a condition of full suspension. During the initial period, and before the full weight of the composite unit is fully suspended from the crane hook, it is desirable that the arrangement and disposition of the respective sling systems be such as to permit of an upward movement of the crane hook without causing a corresponding upward movement of the composite unit or any part thereof. Instead, the horizontal force component of the upward pull of the crane hook is utilized through the proper arrangement and disposition of the balancing sling system to effect withdrawal of the pair of coupling boxes from their normal functioning position (as indicated by the dotted line position in Figure 1), toward each other to a position where they are nested upon the spindle, free and clear of the shafts 12 and 13, and to the full line position as indicated in Figure 1. The position of full suspension of the composite unit, as employed in removing the same, is also indicated in Figure 5.

Instead of utilizing an initial upward pull of the crane hook 1 for drawing the spindle boxes 10, 11 toward each other onto the spindle portions 8, 9, a specific modified arrangement may be employed, as shown in Figures 1 and 2, wherein the initial upward pull upon the balancing slings for drawing the coupling boxes upon the spindle is effected without the upward pull of the crane hook 1. For this purpose there is introduced between the bail 2, as the point of common support for the two sling systems, a hand crane or other means of effecting an upward pull upon the balancing slings during the initial period. As shown in Figures 1 and 2, the balancing sling includes the pair of slings 21 and 22, having the upper end thereof connected to a common ring 20; and hooks 23 and 24 are secured to the lower end of the pair of slings 21, 22, respectively. As a means of facilitating movement of the heavy and bulky coupling boxes, each of which weighs over half a ton, as above indicated, it is desirable that a suitable means be provided on the coupling boxes, which means are of sufficient strength to withstand the forces that are applied in drawing the coupling boxes together upon the spindle, and also to withstand the full weight of the coupling boxes when they are separately suspended. As shown in Figure 1, a slotted recess 27 is formed in the outer periphery of the spindle box and a load-carrying bar 26 extends across said recess and is adapted to receive the hook at the lower end of the balancing slings. Preferably, the bar 26 is disposed centrally of the coupling box and at a point substantially in vertical alignment with the center of gravity when the axis of the spindle is horizontal. As shown in Figures 1 and 2, a chain hoist of the spur gear type, designated generally by the reference character 14, is interposed between the bail member 2 and the common supporting ring 20 for the balancing sling as the means for effecting the axial movement of the coupling boxes upon the spindle during the initial period, and before the load is carried upward. The ring 20 is carried on the spindle crane hook 19, which is at the end of the hoisting chain 28 of the spindle hoisting means. Upward movement of the hook 19 is effected by movement of the chain 29 which, in turn, actuates the spur gear mechanism within the case 18. The supplemental chain is suspended from the bail by passing the hook 15 through the aperture 16 in the bail 2. A detailed description of the supplemental hoist is not thought necessary as it is of the conventional type and known in the art, and it is understood that other means may be employed for effecting the initial movement in the manner above referred to. By employing the arrangement shown in Figures 1 and 2, as above described, it is possible and desirable to position the central sling 3 about the central portion of the spindle and to move the crane hook 1 upward to a point where the sling 3 is brought under tension, so as to support a substantial portion of the weight of the spindle, which, as above indicated, may weigh as much as a ton. It is, of course, impossible to move the spindle upward because of the fact that the coupling boxes in their operative position are in telescoping relation to the shafts 12 and 13. However, it is desirable to relieve the pair of coupling boxes of the weight and load of the spindle shaft during the period when the coupling boxes 10, 11 are drawn toward each other upon the spindle portions 8, 9. However, it is not absolutely essential that the weight of the spindle be relieved from the coupling boxes during the initial period when the coupling boxes are drawn together by an upward pull upon the balancing slings.

Figure 5 shows one modified arrangement particularly adapted for removing the composite unit and presents certain features in common with the arrangement shown in Figures 1 and 2, except that no supplementary crane unit is employed. However, after the coupling boxes 10 and 11 have been drawn toward each other upon the spindle, the general arrangement of the central load-carrying sling 38 and the balancing slings 32, 33 is such that they function in much the same manner as the corresponding sling arrangement functions in Figures 1 and 2 after the load has been suspended. As shown in Figure 5, the balancing sling, including the members 32, 33, and the central load-carrying sling 38, are suspended from a common ring or medium 31 which is supported on the crane hook 1. The central sling is suspended from the ring 31 through the medium of a bifurcated hook 35 and ring 34. One end of the sling 38 is carried on the hook 36, and the other end of the sling includes a length of chain to facilitate adjustments of the length of the sling, such end of the sling being adjustably carried by a logging hook 37. In effecting a cooperative relationship between the action of the two slings, during the initial period of removing the parts when the coupling boxes are drawn toward each other axially of the spindle shaft, the arrangement is preferably such that the balancing sling hooks 23 and 24 engage the lifting pins 26 of the different coupling boxes and the slings 32 and 33 occupy substantially a position corresponding to the dotted line position indicated in Figure 1; and the length of the central modifying sling is so adjusted that the sling 38 is loosely slung below the spider arms of the spindle 6, the length preferably being adjusted so that at a point in the upward movement of the crane hook 1, just before, or at the time when, the ends of the coupling boxes 10 and 11 are free and clear of the ends of the power drive and mill roll shafts, respectively, the sling 38 will engage the peripheral recess 7 in the spider arms 6 of the spindle in such a manner as to support the weight of the spindle in part or whole, perhaps together with the weight of each of the coupling boxes. The coupling boxes may then be pried or moved in any suitable manner toward the spindle so as to be supported on the spindle and to be free and clear of the ends of the power drive and the mill roll shafts. In such position, substantially the entire weight of the composite unit, including the spindle and the pair of coupling boxes, will be carried by the central load-carrying sling 38, and the balancing slings 32 and 33 will serve to perform their function of balancing the coupling boxes 10 and 11 upon the spindle 8 and prevent the accidental slipping of either coupling box from the end of the spindle. Where the slings 32 and 33 perform only the function of balancing, very little strain or force will be imposed upon such slings. However, if it is desired to ease the load carried by the central sling 38, the length thereof may be so adjusted—such, for example, as by lengthening slightly—that a portion of the load is carried by the members 32 and 33 of the balancing sling. The fact that the balancing slings converge from a common point of support outwardly to their respective coupling boxes, serves to prevent any substantial movement of either of the coupling boxes outwardly toward the ends of the spindle shaft.

While the logging hook and the lengthened chain 39 at the end of the central sling 38 is shown as a means for adjusting the length of such sling, it is understood the various other means may be employed which might readily occur to those familiar with the art.

Figure 4 shows a modified form in which the central sling, similar to that shown in Figure 5, is employed, together with the balancing sling including the members 49, 50, similar to Figure 5 excepting that while a common medium of support for the upper ends of the slings provided by the bail 44 is shown, the upper ends of the balancing sling are supported at spaced positions on opposite sides of the point of support for sling 38. As shown, the upper end of one of the balancing sling members 49 is suspended from a ring or oval member 47, the upper end of which, in turn, is carried over the hooked end 45 at one side of the bail 44. The upper end of the other member 50 of the balancing sling is suspended from an oval or ring 48 which, in turn, is carried over the hooked portion 46 on the opposite side of the bail 44. The points of support of the rings 47 and 48 on the bail 44 are out of vertical alignment so that the seat of the support for the ring 48 is higher than the seat of support for the ring 47. Preferably, each member comprising the balancing sling is substantially identical in structure and length. Such a feature is a practical convenience in that it avoids carrying in stock slings of different lengths.

The central sling 38 is suspended from the bail 44 through the medium of the ring 43 and the hook member 40 in a manner very similar to that shown in Figure 5 in which the sling was suspended from the oval or ring 31.

The modified support and arrangement of the system of slings as shown in Figure 4 is one particularly adapted for replacing the composite unit in its normal operative position in alignment with the power drive shaft 12 and the mill roll shaft 13. As shown in Figure 4, the modified arrangement for supporting the upper ends of the members, comprising the balancing sling, causes the balancing sling members to hang in substantially vertical balance, with the upper end of one member of the sling being higher than the other. Such an arrangement and disposition causes the spindle shaft to be disposed at an angle to the horizontal plane. By suspending the composite unit in an angular manner and maintaining such a position by the disposition of the balancing sling, a condition is created which tends to result in a more stable relation between the parts of the composite unit and to prevent relative movement therebetween which might otherwise occur due to their varying inertia effects if the spindle shaft were supported and balanced so that the spindle axis were in substantially a horizontal plane during transport of the composite unit. It is conceivable that in the latter condition, if the spindle and the two coupling boxes were, in effect, freely and independently supported by their respective slings, particularly where the slings were disposed in a vertical plane, a sudden movement of the crane might conceivably bring about a condition which would cause the parts to separate. By having the spindle inclined at an angle with the coupling boxes thereon, a condition exists in which it is unlikely that any varying inertia effect of the various parts would cause relative movement or separation of the parts. One of the reasons why it is desirable to have the members of the balancing sling in a vertical plane, in replacing the parts, in such an arrangement is that such a method of suspending the coupling boxes more readily enables the coupling boxes to be moved away from each other and outwardly of the spindle and upon the power drive shaft 12 and the mill roll shaft 13, respectively. This would not be the case if the members of the balancing sling were disposed at an angle and if they extended outwardly from a common point of support, as indicated in Figure 5. In the latter case, the angular disposition of the balancing sling would preclude the outward movement of the coupling boxes. By the arrangement disclosed in Figure 4, the outward movement of the coupling boxes to their normal functioning position might be facilitated by movement of the crane hook in a vertical plane in a direction toward either the power drive shaft or mill roll shaft.

A further advantage incident to the angular disposition of the spindle shaft, as shown in Figure 4, is that if space permits and there is sufficient clearance between the ends of the drive power shaft 12 and the mill roll shaft 13, the registry of the ends of the spindle and either one or the other of said shafts 12, 13 may be facilitated in the manner indicated in Figure 4, wherein the coupling box 10 extends slightly beyond the end of the spindle 8 so as to form a projecting edge which might engage the lower corner of the shaft 12 in order to facilitate telescopic relation of the coupling box therewith when the axis of the spindle is in a horizontal plane in alignment with the axis of the shaft 12. Of course, if the outer end of the coupling box 11 projects slightly beyond the end of the spindle, a projecting edge would be formed which might be lowered in contact with the upper edge of the shaft 13 in order to facilitate alignment.

While one preferred form and various modifications of the invention have been shown, it is understood that various other changes in detail and arrangement might be made without departing from the spirit of the invention as defined by the appended claims.

I claim:

1. Hoisting means for handling metal rolling mill mechanism, said mechanism including the relatively heavy and bulky parts of a 3-part driving coupling of a metal rolling mill as a composite unit, in a manner to permit relative movement between the 3 parts before said parts are held in suspended nested relation as a composite unit, said 3-part driving coupling including a spindle having a centrally disposed spider or collar with sling positioning means disposed on the periphery thereof and also including a pair of coupling boxes slidable axially of said spindle, one on each end thereof, each coupling box being adapted to be slid beyond or upon the end of the spindle to effect or interrupt a telescoping driving relation with a driving and driven shaft or spindle, said composite unit including the spindle together with a coupling box mounted on each end thereof, said hoisting means for handling the composite unit including a plurality of independent slings, one of said slings constituting a central spindle sling arranged and disposed to be slung about the central portion of the spindle when in suspended position so as to carry the weight of said spindle and the weight of each of the coupling boxes mounted on the ends thereof after being moved thereon from the driving and driven members, respectively, and another sling constituting a pair of balancing slings, each one of the pair of balancing slings being connected to one of the coupling boxes, respectively, in a manner to balance the composite unit and prevent the accidental slippage of either coupling box from the end of the spindle while freely suspended.

2. Hoisting means for removing and replacing, as a composite unit, the 3-part coupling of mill roll mechanism as defined in claim 1 and including a common medium of support for one end of the pair of balancing slings and each end of the spindle sling, said pair of balancing slings each being of equal length, and said central sling including means for adjusting the length thereof.

3. Hoisting means for handling, as a composite unit, the 3-part mill roll connecting coupling mechanism as defined in claim 1 and including a common medium of support for one end of the pair of balancing slings and each end of the spindle sling, each sling of said pair of balancing slings being of equal length, and said spindle sling including means for adjusting the length thereof to be loosely slung about the spindle, said means for adjusting the length of the spindle sling including a logging hook and a length of chain at one end of the central sling whereby various links of the chain may be engaged in the logging hook to so adjust the length of chain to determine the time and conditions when the weight of the spindle or of the composite unit will be carried by said spindle sling, when the common medium of support is moved upward.

4. Hoisting means for handling during removal and replacement, metal rolling mill mechanism, said mechanism including the relatively heavy and bulky parts of a 3-part driving coupling of a metal rolling mill as a composite unit, said 3-part driving coupling including a spindle having a centrally disposed spider or collar with sling positioning means disposed on the periphery thereof, said composite unit including the spindle together with a coupling box mounted on each end thereof, said hoisting means for handling the 3-part composite unit including a plurality of independent slings, one of said slings comprising a central spindle sling arranged and disposed to be slung about the central portion of the spindle so as to carry the weight of said spindle and the weight of each of the coupling boxes mounted on the ends thereof in part or in whole, and another sling including a pair of balancing slings, each one of the pair being connected to one of the coupling boxes, respectively, in a manner to balance the composite unit and prevent the accidental slippage of either coupling box from the end of the spindle while freely suspended.

5. Hoisting means for handling a rolling mill connecting coupling as a composite unit, as defined in claim 4, and including a common medium of support for one end of the pair of balancing slings and each end of the spindle sling and said central sling including means for adjusting the length thereof to determine the time and conditions when the weight of the spindle or of the composite unit will be carried by said central sling to enable a horizontal force component of the upward movement of the upper end of the pair of balancing slings to be effective to cause the axial sliding of each of said coupling boxes on the spindle shaft toward the centrally disposed spider thereon before the central sling engages the spindle to support the weight of said spindle or said composite unit.

6. Hoisting means for handling a 3-part rolling mill connecting coupling as defined in claim 4 and including a common medium of support for one end of the pair of balancing slings and each end of the spindle sling, means effecting cooperation between the functioning of said central sling and said pair of balancing slings whereby an upward pull on the upper end of the pair of balancing slings is effective to draw each of the coupling boxes axially of the spindle toward the centrally disposed spider on said spindle before the central sling becomes effective to sustain the weight of the composite unit and move said unit upward, said last named means including an independent elevating means interposed between the points of support on the common medium of support for the spindle sling, and a common point of support for each one of the pair of balancing slings.

7. Hoisting means for handling a rolling mill connecting coupling as defined in claim 4 and including a common medium of support for one end of the pair of balancing slings and each end of the spindle sling and said central sling including means for adjusting the length thereof and so arranging the length of the central sling that said central sling does not function to carry the weight of the composite unit and move it upwards until after the upward movement of said common medium of support has moved the pair of coupling boxes along the spindle axis toward each other to a position where they are free and clear of a power drive shaft and mill roll shaft, respectively, said common medium of support including a bail adapted to be suspended from a crane hook, said bail supporting the central load-carrying sling and the pair of balancing slings, the support for said balancing sling being disposed on the bail centrally thereof and below the crane hook support, and the support for each one of the pair of balancing slings being spaced from each other on the bail and being disposed on opposite sides of the support for the central sling.

8. A coupling box for a rolling mill connecting coupling of the type in which said coupling box is adapted to be moved axially on a spindle by a horizontal force component of the upward pull of a sling suspended from a crane hook, said coupling box including means on the periphery of said coupling box to effect detachable connection with one end of a sling including a slotted recess adapted to receive the end of a hoisting hook and a hoisting bar extending across said slotted recess and adapted to receive a hoisting hook, said hoisting bar being disposed substantially centrally of the coupling box between the ends thereof to minimize any frictional wedging effect when the coupling box is moxed axially of the spindle when suspended from a vertically disposed sling.

9. Hoisting means for handling, during the replacement thereof, a rolling mill connecting coupling as defined in claim 4 and including a common medium of support for one end of the pair of balancing slings and each end of the spindle sling and said central sling, including means for adjusting the length thereof and so arranging the length of the central sling that said central sling does not function to carry the weight of the composite unit and move it upwards until after the upward movement of said common medium of support has moved the pair of coupling boxes along the spindle axis toward each other to a position where they are free and clear of a power drive shaft and mill roll shaft, respectively, said common medium of support including a bail adapted to be suspended from a crane hook, said bail supporting the central load-carrying sling and the pair of balancing slings, the support for said balancing sling being disposed on the bail centrally thereof and below the crane hook support, and the support for each one of the pair of balancing slings being spaced from each other on the bail and being disposed on opposite sides of the support for the central sling, the supports on the bail for one end of each one of the pair of the balancing slings being at different heights, each of said balancing slings being of substantially the same length whereby when the composite unit is suspended from said slings, the spindle, with the coupling boxes thereon is disposed at an angle to stabilize and minimize the likelihood of relative movement between the parts of the composite unit due to the varying inertia effect of the different parts while freely suspended during transport, and to facilitate alignment of the coupling boxes with stationary shafts in replacing the connecting couplings to normal driving relation with the power drive and mill roll shafts, respectively.

EMIL STELLER.